US012128676B2

(12) United States Patent
Hanamoto et al.

(10) Patent No.: US 12,128,676 B2
(45) Date of Patent: Oct. 29, 2024

(54) PRINTING APPARATUS

(71) Applicant: RISO KAGAKU CORPORATION, Tokyo (JP)

(72) Inventors: Yoshihiro Hanamoto, Tokyo (JP); Hirokazu Yabune, Tokyo (JP); Masashi Hara, Tokyo (JP)

(73) Assignee: RISO KAGAKU CORPORATION, Tokyo (JP)

( * ) Notice: Subject to any disclaimer, the term of this patent is extended or adjusted under 35 U.S.C. 154(b) by 132 days.

(21) Appl. No.: 17/965,302

(22) Filed: Oct. 13, 2022

(65) Prior Publication Data

US 2023/0125577 A1 Apr. 27, 2023

(30) Foreign Application Priority Data

Oct. 27, 2021 (JP) ................................ 2021-175333
Aug. 3, 2022 (JP) ................................ 2022-123759

(51) Int. Cl.

| | |
|---|---|
| ***B41J 29/377*** | (2006.01) |
| ***B41J 11/42*** | (2006.01) |
| ***B41J 13/00*** | (2006.01) |
| ***B41J 13/08*** | (2006.01) |
| ***B41J 29/38*** | (2006.01) |
| *B65H 5/00* | (2006.01) |
| *B65H 5/26* | (2006.01) |
| *B65H 7/20* | (2006.01) |

(52) U.S. Cl.

CPC ........... *B41J 13/0045* (2013.01); *B41J 11/42* (2013.01); *B41J 13/08* (2013.01); *B41J 29/38* (2013.01); *B41J 29/377* (2013.01); *B65H 5/006* (2013.01); *B65H 5/26* (2013.01); *B65H 7/20* (2013.01); *B65H 2801/06* (2013.01)

(58) Field of Classification Search

CPC ...... B41J 29/377; B41J 11/42; B41J 13/0045; B41J 13/08; B41J 29/38; B65H 5/006; B65H 5/26; B65H 7/20; B65H 2801/06
See application file for complete search history.

(56) References Cited

U.S. PATENT DOCUMENTS 9,327,530 B1 * 5/2016 Hara .................... B41J 13/0045
2018/0056677 A1 3/2018 Hara

FOREIGN PATENT DOCUMENTS

JP 2018-34926 A 3/2018

* cited by examiner

*Primary Examiner* — Geoffrey S Mruk
(74) *Attorney, Agent, or Firm* — GREENBLUM & BERNSTEIN, P.L.C.

(57) ABSTRACT

A printing apparatus includes: a printing section; a print conveyor conveying a medium in the printing section; a constant-speed conveyor conveying the medium at a variable constant conveying speed in a circulation route for duplex printing; a registration roller pair against which the medium to be conveyed to the printing section is caused to abut; and a processor determining a conveyance schedule for the medium based on at least one of a first conveyance route length between a downstream end portion in a conveying direction of the print conveyor and an upstream end portion in the conveying direction of the constant-speed conveyor and a second conveyance route length between a downstream end portion in the conveying direction of the constant-speed conveyor and the registration roller pair, and a medium length in the conveying direction of the medium.

6 Claims, 11 Drawing Sheets

| SHEET LENGTH [mm] | NUMBER OF SHEETS IN ROUTE [SHEETS] | DUPLEX PRINTING PRODUCTIVITY [ppm] |
|---|---|---|
| 210 | 4 | 83.3 |
| 420 | 2 | 43.9 |
| 450 | 1 | 10.7 |
| 450 | 2 | 42.7 |

FIG. 7

PRINTING APPARATUS

CROSS-REFERENCES

This application is based upon and claims the benefit of priority of the prior Japanese Patent Application No. 2021-175333 filed on Oct. 27, 2021 and the prior Japanese Patent Application No. 2022-123759, filed on Aug. 3, 2022, the entire contents of which are incorporated herein by reference.

FIELD

The embodiments discussed herein are related to a printing apparatus.

BACKGROUND

Conventionally, there has been proposed a technique in which a printing apparatus for circulating and conveying paper in a conveyance route to perform interleaf type duplex printing is provided with an acceleration/deceleration section between a printing unit and a constant-speed conveyance section in which the paper is conveyed at a constant conveying speed in the circulation route, thereby efficiently re-feeding paper to the printing unit and improving productivity (see, for example, Japanese Patent Laid-Open No. 2018-034926).

SUMMARY

According to one aspect of the present invention, a printing apparatus includes: a printing section; a print conveyor conveying a medium in the printing section; a constant-speed conveyor conveying the medium at a variable constant conveying speed in a circulation route for duplex printing; a registration roller pair against which the medium to be conveyed to the printing section is caused to abut; and a processor determining a conveyance schedule for the medium based on at least one of a first conveyance route length between a downstream end portion in a conveying direction of the print conveyor and an upstream end portion in the conveying direction of the constant-speed conveyor and a second conveyance route length between a downstream end portion in the conveying direction of the constant-speed conveyor and the registration roller pair, and a medium length in the conveying direction of the medium.

The object and advantages of the present invention may be realized by the elements and their combinations described in the claims.

BRIEF DESCRIPTION OF DRAWINGS

FIG. 7 is a table showing the relationship between the number of sheets of paper in a circulation route for each paper length and the productivity of duplex printing in the first embodiment.

DESCRIPTION OF EMBODIMENTS

When duplex printing is performed on long paper in a printing apparatus provided with a constant-speed conveyance unit in a circulation route for duplex printing and when, for example, the paper has such a length that the paper is to be nipped at the same time by rear end rollers (rollers at a downstream end portion) of the printing unit and by inlet rollers (rollers at an upstream end portion) of the constant-speed conveyance unit, the conveying speed of the constant-speed conveyance cannot be made higher than the conveying speed in the printing unit. In this case, it is impossible to convey a plurality of sheets of paper in the circulation route, and printing productivity cannot be improved.

Further, when in the case of performing duplex printing on long paper, for example, when the route between exit rollers (rollers at the downstream end portion) of the constant-speed conveyance unit and a registration roller pair does not have enough length to decelerate the paper to a prescribed abutting speed against the registration roller pair for skew correction, deceleration and stoppage cannot be synchronized among the rollers, which not only damages the paper due to pulling the paper from both sides or folding the paper, but also causes jams. Therefore, when a route length for the deceleration cannot be secured, it is impossible to increase the conveying speed of the constant-speed conveyance in order to convey a plurality of sheets of paper in the circulation route. In this case, the productivity of printing cannot be improved either.

If the acceleration/deceleration section is extended for allowing even a plurality of sheets of long paper to be conveyed to the circulation route, the overall size of the printing apparatus and the number of rollers to be controlled would increase, resulting in an increase in cost.

Hereinafter, printing apparatuses according to first and second embodiments of the present invention will be described with reference to the drawings.

First Embodiment

Figure 1:
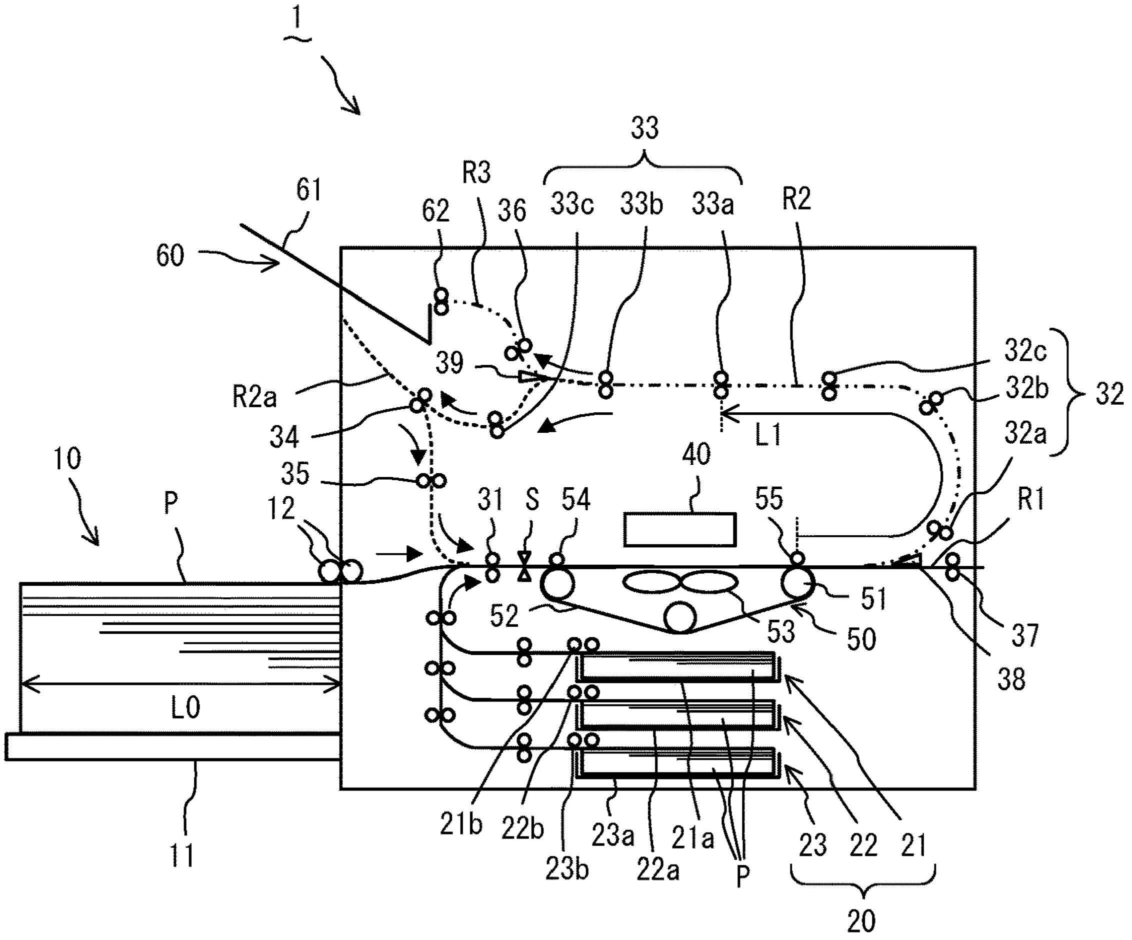
FIG. 1 is a diagram showing an internal structure of a printing apparatus according to a first embodiment.

FIG. 1 is a diagram showing the internal structure of the printing apparatus 1 according to a first embodiment.

Figure 2:
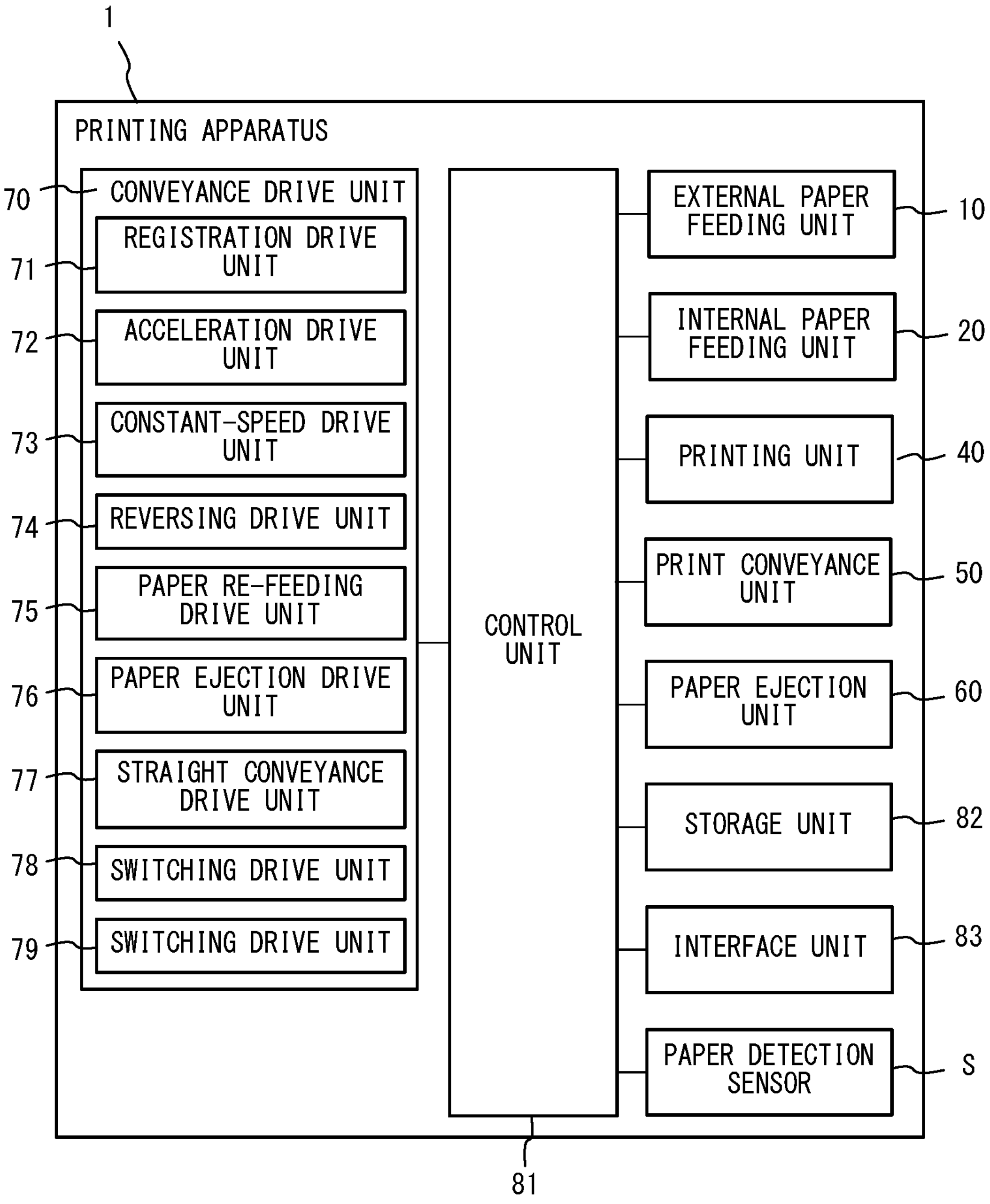
FIG. 2 is a diagram showing a control configuration of the printing apparatus according to the first embodiment.

FIG. 2 is a diagram showing the control configuration of the printing apparatus 1.

As shown in FIGS. 1 and 2, the printing apparatus 1 includes an external paper feeding unit 10, an internal paper feeding unit 20, a printing unit (printing section, printer) 40, a print conveyance unit (print conveyor) 50, a paper ejection unit 60, and a paper detection sensor S. Further, as shown in FIG. 1, the printing apparatus 1 includes a registration roller pair 31, an accelerating conveyance unit 32, a constant-speed conveyance unit (constant-speed conveyor) 33, a reversing conveyance unit 34, a paper re-feeding unit 35, a paper ejecting conveyance unit 36, a straight conveyance unit 37, and route switching units 38 and 39. Further, as shown in FIG. 2, the printing apparatus 1 includes a conveyance drive unit 70, a control unit 81, a storage unit 82, and an interface unit 83.

In FIG. 1, a straight route R1 for paper P which continues from an external paper feeding unit 10 or an internal paper feeding unit 20 is indicated by a solid line, a route continuing from a circulation route R2 for duplex printing located above the printing unit 40 to a paper ejection route R3 is indicated by a two-dot chain line, and a reversing route R2*a* of the circulation route R2 is indicated by a broken line. Note that the paper P is an example of a medium. In this specification, "paper feeding" is an example of "feeding", and "paper ejection" is an example of "discharge". Therefore, paper feeding can be replaced with feeding, and paper ejection can be replaced with discharge. The medium may be a sheet-shaped medium made of a material other than paper, or a medium having a folded portion such as an envelope.

The external paper feeding unit 10 is arranged so as to be exposed to the outside of the printing apparatus 1. The external paper feeding unit 10 includes a paper feeding tray 11 on which sheets of paper P before printing are stacked, and paper feeding rollers 12 for drawing out and conveying a sheet of paper P located at the top of the plurality of sheets of paper P stacked on the paper feeding tray 11. Although not shown, an actuator such as a motor for driving the paper feeding tray 11 and the paper feeding rollers 12 are arranged in the external paper feeding unit 10. Note that the external paper feeding unit 10 is an example of a feeder feeding a medium (for example, paper P) to the printing unit 40.

The internal paper feeding unit 20 includes a first paper feeding unit 21, a second paper feeding unit 22, and a third paper feeding unit 23.

The first paper feeding unit 21, the second paper feeding unit 22, and the third paper feeding unit 23 are arranged in this order from the top inside the printing apparatus 1. The first paper feeding unit 21, the second paper feeding unit 22, and the third paper feeding unit 23 respectively include paper feeding tray 21*a*, 22*a*, and 23*a* on which sheets of paper P before printing are stacked, and paper feeding rollers 21*b*, 22*b*, and 23*b* which draw out and convey sheets of paper P located at the tops of pluralities of sheets of paper P stacked on the paper feeding trays 21*a*, 22*a* and 23*a*. Although not shown, actuators such as motors for driving the paper feeding rollers 21*b*, 22*b*, and 23*b* are arranged in the internal paper feeding unit 20. Note that the internal paper feeding unit 20 is an example of a feeder feeding a medium (for example, paper P) to the printing unit 40 in the same manner as the external paper feeding unit 10.

The registration roller pair 31 is arranged on the upstream side in the conveying direction of the printing unit 40 and the print conveyance unit 50 in the straight route R1 that continues from the external paper feeding unit 10 or the internal paper feeding unit 20. The registration roller pair 31 against which the paper P to be conveyed to the printing unit 40 is caused to abut. As a result, the registration roller pair 31 corrects the skew of the paper P and conveys the paper P while nipping it. A paper detection sensor S is arranged downstream of the registration roller pair 31 in the conveying direction and upstream of the printing unit 40 in the conveying direction. This paper detection sensor S is an example of a medium detection sensor for detecting a medium (for example, paper P), and for example, it outputs an ON signal while it detects paper P, and outputs an OFF signal while it detects no paper P.

The accelerating conveyance unit 32 can accelerating and conveying the paper P in the circulation route R2. The accelerating conveyance unit 32 includes accelerating roller pairs 32*a*, 32*b*, and 32*c* for conveying the paper P while nipping it.

The constant-speed conveyance unit 33 conveys the paper P at a constant conveying speed, but a variable conveying speed on the downstream side in the conveying direction of the accelerating conveyance unit 32 of the circulation route R2. The constant-speed conveyance unit 33 includes constant-speed roller pairs 33*a*, 33*b*, and 33*c* for conveying the paper P while nipping it.

The reversing conveyance unit 34 is a switchback roller pair for reversing the front and back of the paper P by performing switchback conveyance on the paper P while nipping the paper P in the reversing route R2*a* provided on the downstream side in the conveying direction of the constant-speed conveyance unit 33 in the circulation route R2.

The paper re-feeding unit 35 re-feeds the paper P to the printing unit 40 on the downstream side in the conveying direction of the constant-speed conveyance unit 33 in the circulation route R2. The paper re-feeding unit 35 decelerates and conveys the paper P at the time when the paper P abuts against the registration roller pair 31.

A paper ejecting conveyance unit 36 is a paper ejection roller pair for conveying the paper P to the paper ejection unit 60 while nipping the paper P in the paper ejection route R3 that is connected to the circulation route R2 on the upstream side in the conveying direction of the reversing route R2*a*.

The straight conveyance unit 37 is a straight roller pair which is arranged at a downstream end portion in the conveying direction of the straight route R1, and conveys the paper P while nipping the paper P to the paper ejection unit, the conveyance unit, a post-processing device, and the like (not shown) which are connected to the printing apparatus 1.

The route switching unit 38 switches the conveyance route for the paper P printed by the printing unit 40 in the straight route R1 between the straight route R1 and the circulation route R2. The route switching unit 38 is, for example, a flipper.

The route switching unit 39 switches the conveyance route of the paper P conveyed through the circulation route R2 between the reversing route R2*a* and the paper ejection route R3. The route switching unit 39 is, for example, a flipper.

The printing unit 40 includes, for example, a line head type inkjet head (not shown) which is provided for each of colors used for printing. The printing method of the printing unit 40 may be a printing method other than the inkjet printing method.

The print conveyance unit 50 is arranged to face the printing unit 40, and conveys the paper P in the printing unit 40. The print conveyance unit 50 includes a plurality of pulleys 51, a belt 52 stretched over these pulleys 51, a suction fan 53 for adsorbing paper P to the belt 52 by sucking air through a plurality of holes provided in the belt 52, a guide roller 54 which is arranged to face the pulley 51 at an upstream end portion in the conveying direction of the print conveyance unit 50, and a guide roller 55 which is arranged to face the pulley 51 at a downstream end portion in the conveying direction of the print conveyance unit 50.

Note that the print conveyance unit 50 is not limited to a unit for conveying the paper P while adsorbing the paper P.

The paper ejection unit 60 is arranged so as to be exposed to the outside of the printing apparatus 1. The paper ejection unit 60 includes a paper ejection tray 61 on which printed paper P is stacked, and a paper ejection roller pair 62 for conveying paper P to the paper ejection tray 61.

The conveyance drive unit 70 shown in FIG. 2 includes a registration drive unit 71 for driving the registration roller pair 31, an acceleration drive unit 72 for driving the accelerating conveyance unit 32, a constant-speed drive unit 73 for driving the constant-speed conveyance unit 33, a reversing drive unit 74 for driving the reversing conveyance unit 34, a paper re-feeding drive unit 75 for driving the paper re-feeding unit 35, a paper ejection drive unit 76 for driving the paper ejection conveyance unit 36, a straight conveyance drive unit 77 for driving the straight conveyance unit 37, and switching drive units 78 and 79 for driving the route switching units 38 and 39, respectively. Each drive unit includes one or a plurality of actuators such as motors. Further, a single actuator may serve as a plurality of drive units.

The control unit 81 includes a processor (for example, CPU: Central Processing Unit) that functions as an arithmetic processing unit for controlling the operation of the entire printing apparatus 1. Although details will be described later, the control unit 81 determines a conveyance schedule for paper P based on a first conveyance route length L1 between the downstream end portion (the guide roller 55) in the conveying direction of the print conveyance unit 50 and the upstream end portion (the constant-speed roller pair 33*a*) in the conveying direction of the constant-speed conveyance unit 33, and a paper length L0 in the conveying direction of the paper P. This conveyance schedule includes a conveying speed and a conveyance timing of the paper P in each unit of the printing apparatus 1. Therefore, the print timing in the printing unit 40 is determined according to the conveyance schedule. Note that the conveyance schedule can be adjusted, for example, by the conveying speed on the reverse side of the reversing conveyance unit 34 (the conveying speed in the paper re-feeding unit 35), a protrusion amount by which the rear end of the paper P is protruded from the reversing route R2*a* when the reversing conveyance unit 34 switches back, a stop time of the paper P during switchback, a slack amount when the paper P abuts against the registration roller pair 31, a low abutting speed, a period for maintaining this abutting speed, and the like. Further, when the paper length L0 is unknown at the time of starting feeding of the paper P by the external paper feeding unit 10 or the internal paper feeding unit 20, the control unit 81 calculates the paper length L0 based on an output value of the paper detection sensor S. For example, the control unit 81 may calculate the paper length L0 based on a conveyance amount of an encoder of the print conveyance unit 50 (belt 52) during a period when the paper detection sensor S is detecting the paper P (during a period when an output signal of the paper detection sensor S is ON).

The storage unit 82 includes, for example, memories such as ROM (Read Only Memory) which is a read-only semiconductor memory in which predetermined control programs are recorded in advance, and RAM (Random Access Memory) that is a semiconductor memory which is used as a work storage area as necessary when the processor executes various control programs and can be written and read at any time, and a hard disk device, and the like.

The interface unit 83 receives and transmits various information from and to external devices. For example, the interface unit 83 receives a print job including print data from a user terminal.

Next, a normal printing operation in the printing apparatus 1 will be described.

When a print job is input, the control unit 81 shown in FIG. 2 controls each unit of the printing apparatus 1 so as to feed and convey the paper P. Further, the control unit 81 controls the printing unit 40 so that the image data included in the print job is subjected to predetermined image processing, and then printed on the paper P conveyed by the print conveyance unit 50.

Here, in the case of simplex printing, as shown in FIG. 1, unprinted sheets of paper P are sequentially drawn out from any one of the external paper feeding unit 10, the first paper feeding unit 21, the second paper feeding unit 22, and the third paper feeding unit 23, and sequentially fed at such a timing that each sheet of paper P is conveyed at a predetermined sheet interval in the print conveyance unit 50. The fed paper P is printed by the printing unit 40 while being conveyed at a predetermined conveying speed in the print conveyance unit 50. The printed paper P is ejected from the paper ejection unit 60.

When a paper ejection destination is a post-processing device, the conveyance route for the printed paper P is set to a route passing through the straight route R1 as it is by the route switching unit 38. Thereafter, the paper P is ejected to the post-processing device by the straight conveyance unit 37. On the other hand, when the paper ejection destination is the paper ejection unit 60, the conveyance route for the printed paper P is guided to the circulation route R2 by the route switching unit 38, and is guided to the paper ejection route R3 by the route switching unit 39. Then, the paper P is ejected to the paper ejection unit 60 by the paper ejection conveyance unit 36.

In the case of duplex printing, unprinted sheets of paper P are sequentially fed at timings in which the time between paper feeding timings for the respective sheets of paper P is double the paper feeding timing in the case of simplex printing. The fed paper P is printed by the printing unit 40 while being conveyed by the print conveyance unit 50 as in the case of simplex printing.

The one-side-printed paper P is guided to the circulation route R2 for duplex printing by the route switching unit 38, conveyed by the accelerating conveyance unit 32 and the constant-speed conveyance unit 33, and then conveyed to the reversing route R2*a* by the route switching unit 39. The paper P which has reached the reversing conveyance unit 34 is switched back.

Next, the paper P is conveyed to the registration roller pair 31 by the paper re-feeding unit 35. Then, the paper P is re-fed to the printing unit 40 after the skew thereof has been corrected by the registration roller pair 31 as described above.

Here, one-side-printed sheets of paper P are re-fed at such a timing that the sheets of paper P and unprinted sheets of paper P to be sequentially fed are alternately sent to the printing unit 40. As described above, in the case of duplex printing, the time between the paper feeding timings for the respective sheets of paper P is set to be double the paper feeding timing in the case of simplex printing. For this reason, it is possible to insert a one-side-printed sheet of paper P between unprinted sheets of paper P, so that one-side-printed sheets of paper P can be re-fed alternately with unprinted sheets of paper P.

The one-side-printed paper P is switched back by the reversing conveyance unit 34, and then sent to the printing unit 40 with an unprinted side thereof being faced up. The unprinted side of the one-side-printed paper P is printed by the printing unit 40 while the one-side-printed paper P is conveyed by the print conveyance unit 50. Then, the double-side-printed paper P is ejected to the paper ejection unit 60 or the post-processing device.

In the following description, determination of a conveyance schedule for paper P whose paper length L0 in the conveying direction is a non-standard length (for example, 450 mm) exceeding, for example, the size (420 mm) in the longitudinal direction of A3 size (420 mm×297 mm) will be described with reference to FIGS. 3 to 7.

Figure 3:
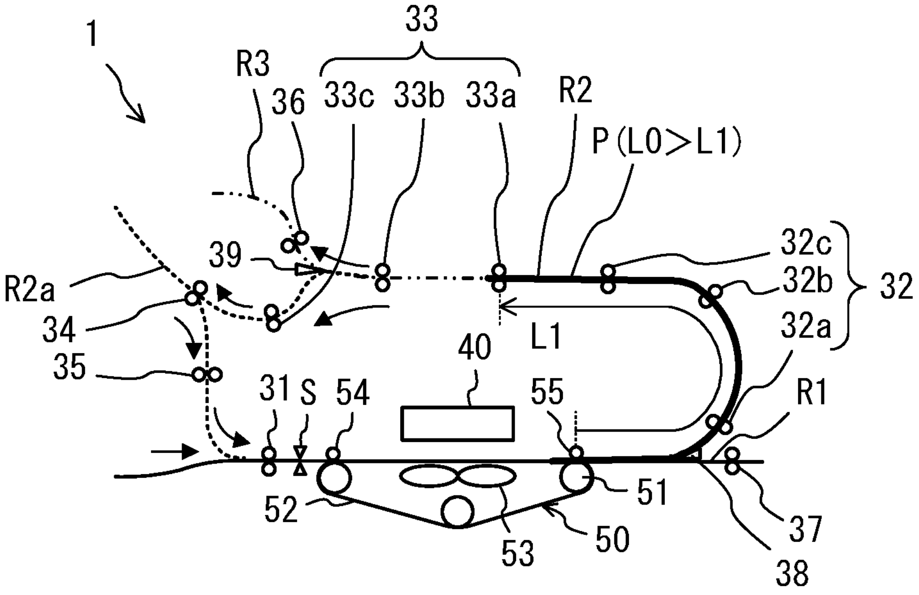
FIG. 3 is a diagram showing an example in which the length of paper is longer than a first conveyance route length in the first embodiment.

FIG. 3 is a diagram showing an example in which the paper length L0 is longer than a first conveyance route length L1.

Figure 4:
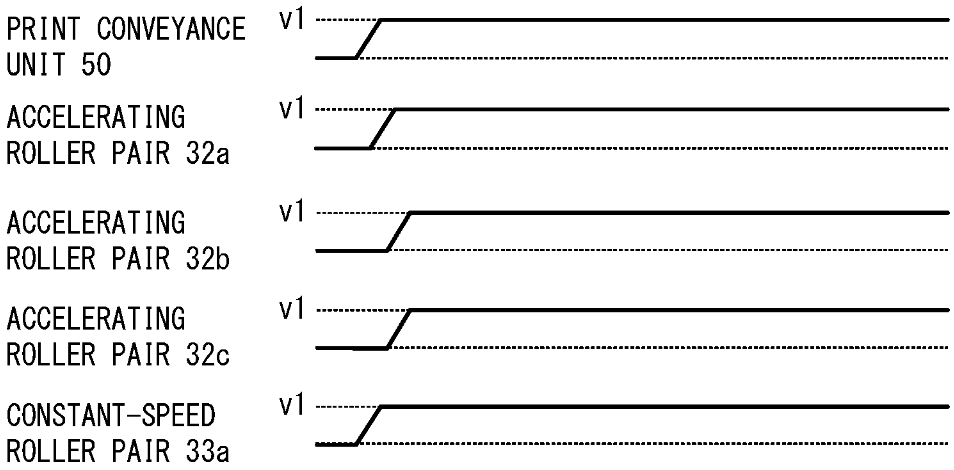
FIG. 4 is a diagram showing the conveying speed when the length of paper is longer than the first conveyance route length in the first embodiment.

FIG. 4 is a diagram showing the conveying speed when the paper length L0 is longer than the first conveyance route length L1.

As shown in FIG. 3, when the paper length L0 is longer than the first conveyance route length L1 between the downstream end portion (the guide roller 55) in the conveying direction of the print conveyance unit 50 and the upstream end portion (the constant-speed roller pair 33*a*) in the conveying direction of the constant-speed conveyance unit 33 (L0>L1), the conveying speed in the constant-speed conveyance unit 33 cannot be made higher than the conveying speed v1 of the print conveyance unit 50. Therefore, the control unit 81 makes the conveying speed in the constant-speed conveyance unit 33 equal to the conveying speed v1 of the print conveyance unit 50. When the conveying speed v1 of the constant-speed conveyance unit 33 is equal to the conveying speed v1 of the print conveyance unit 50, a plurality of sheets of paper P cannot be conveyed in the circulation route R2, and only one sheet of paper P is conveyed.

Further, as shown in FIG. 4, the accelerating roller pairs 32*a*, 32*b*, and 32*c* of the accelerating conveyance unit 32 cannot accelerate and convey the paper P, and conveys the paper P at the conveying speed v1 of the print conveyance unit 50 (the conveying speed v1 of the constant-speed roller pair 33*a*).

Figure 5:
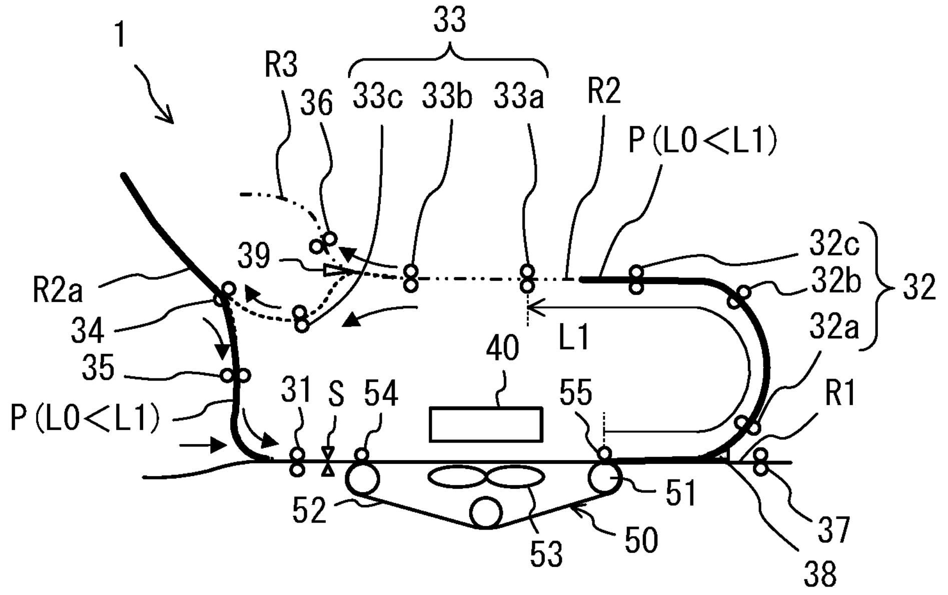
FIG. 5 is a diagram showing an example in which the length of paper is shorter than the first conveyance route length in the first embodiment.

FIG. 5 is a diagram showing an example in which the paper length L0 is shorter than the first conveyance route length L1.

Figure 6:
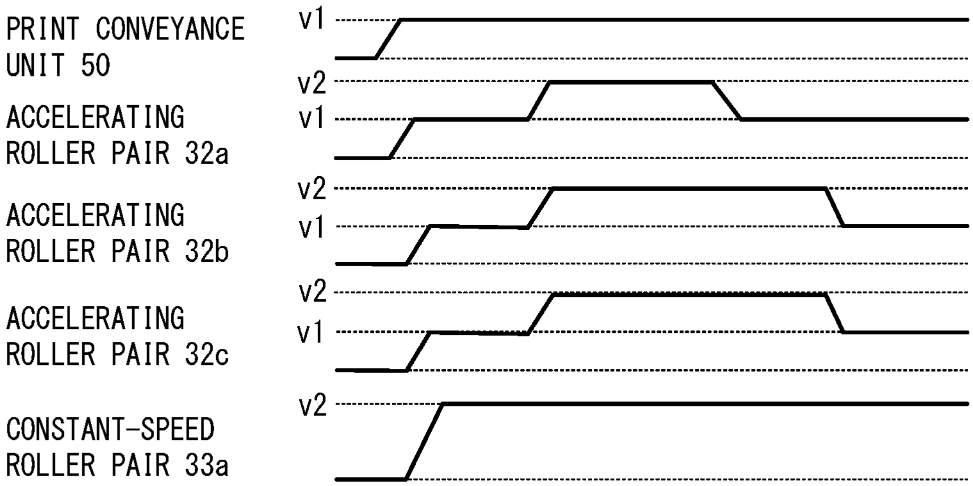
FIG. 6 is a diagram showing the conveying speed when the length of paper is shorter than the first conveyance route length in the first embodiment.

FIG. 6 is a diagram showing the conveying speed when the paper length L0 is shorter than the first conveyance route length L1.

As shown in FIG. 5, when the paper length L0 is shorter than the first conveyance route length L1 and when the sum of the paper length L0 and a distance required to increase the conveying speed v1 in the print conveyance unit 50 to a conveying speed v2 in the constant-speed conveyance unit 33 is equal to or less than the first conveyance route length L, the control unit 81 shown in FIG. 2 makes the conveying speed v2 in the constant-speed conveyance unit 33 higher than the conveying speed v1 in the print conveyance unit 50 so as to increase the number of sheets of paper P in the circulation route R2 (for example, two sheets of paper) as compared with a case where the conveying speed in the constant-speed conveyance unit 33 is equal to the conveying speed v1 in the print conveyance unit 50 (for example, one sheet of paper in the example of FIGS. 3 and 4).

Here, similarly to the case where the conveying speed in the constant-speed conveyance unit 33 is equal to the conveying speed v1 in the print conveyance unit 50, the conveying speed in the constant-speed conveyance unit 33 may be increased while the number of the sheets of paper P in the circulation route R2 is kept to one, but as shown in FIG. 7 described later, by increasing the number of sheets of paper P in the circulation route R2 from one to two, printing productivity can be dramatically improved.

As shown in FIG. 7, when the paper length L0 is equal to 210 mm which is the length in the longitudinal direction of A5 or in the lateral direction of A4 and the number of sheets of paper P in the circulation route R2 is equal to four, duplex printing of 83.3 sheets per minute can be performed. Further, when the paper length L0 is equal to 420 mm which is the length in the longitudinal direction of A3, for example, and the number of sheets of paper P in the circulation route R2 is equal to two, as compared with the case where the paper length L0 is equal to 210 mm, the paper length L0 increases and the number of sheets of paper in the circulation route R2 decreases, but the conveying speed can be increased, so that duplex printing of 43.9 sheets per minute can be performed.

There will be reviewed a case where like paper P shown in FIG. 5, the conveying speed in the constant-speed conveyance unit 33 is set to be equal to the conveying speed v1 in the print conveyance unit 50 although the sum of the paper length L0 and the distance required to increase the conveying speed v1 in the print conveyance unit 50 to the conveying speed v2 in the constant-speed conveyance unit 33 is equal to or less than the first conveyance route length L (the paper length L0 is equal to 450 mm). In this case, the number of sheets of paper P in the circulation route R2 is equal to one, and only duplex printing of 10.7 sheets per minute can be performed.

Further, with respect to the paper P having a paper length L0 of 450 mm, when the conveying speed v2 in the constant-speed conveyance unit 33 is set to be equal to or more than the double of the conveying speed v1 in the print conveyance unit 50 so that the number of sheets of paper P in the circulation route R2 is equal to two sheets, duplex printing of 42.7 sheets per minute can be performed.

Next, a modification of the first embodiment will be described.

Figure 8:
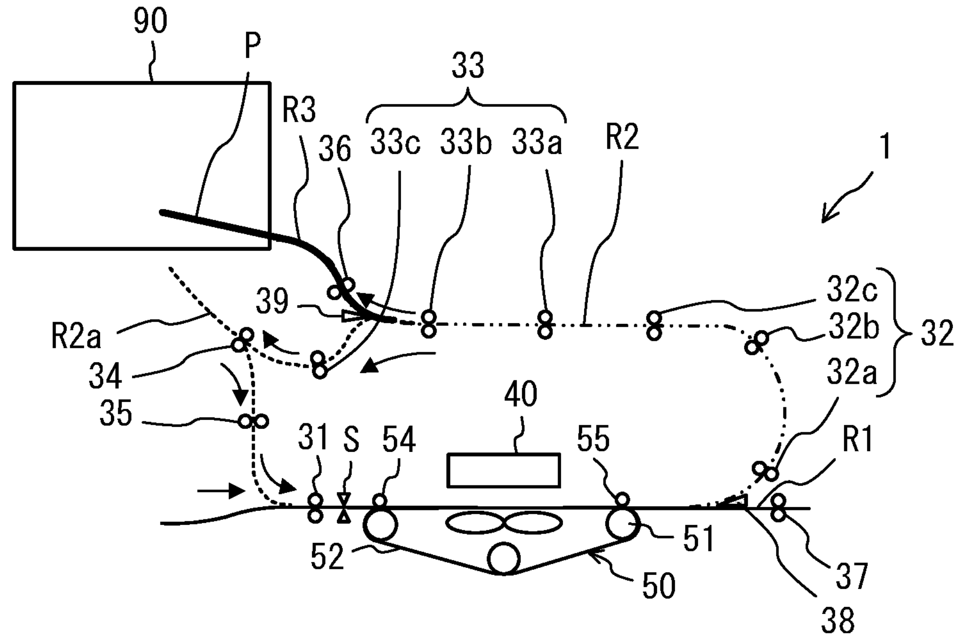
FIG. 8 is a diagram showing a printing apparatus including a discharging device according to a modification of the first embodiment.

FIG. 8 is a diagram showing a printing apparatus 1 including a discharge device 90 according to the modification of the first embodiment.

In particular, when a discharge device 90 shown in FIG. 8, which is an optional device, for example, is arranged instead of the paper ejection unit 60 shown in FIG. 1, restriction may occur in the conveying speed in the discharge device 90 in the case of long paper P.

If restriction occurs in the conveying speed in the discharge device 90, the conveying speed in the paper ejection conveyance unit 36 is set to be equal to the conveying speed in the discharge device 90. Further, the conveying speed in the constant-speed conveyance unit 33 is set to be equal to the conveying speed in the paper ejection conveyance unit 36. As a result, it may be difficult to increase the conveying speed in the constant-speed conveyance unit 33 to a conveying speed which is enough to convey two sheets of paper P to the circulation route R2 as described above.

Therefore, when the conveying speed in the constant-speed conveyance unit 33 is set to be equal to the conveying speed in the paper ejection conveyance unit 36 in this way and when the conveying speed in the constant-speed conveyance unit 33 is set to be higher than the conveying speed v1 in the print conveyance unit 50 as described above, the control unit 81 may determine a conveyance schedule for paper P so as to increase the number of sheets of paper P in the circulation route R2 from one sheet (when the conveying speed in the constant-speed conveyance unit 33 is equal to the conveying speed in the print conveyance unit 50) to two sheets. For example, the control unit 81 may determine the conveyance schedule for paper P by adjusting the stop time of the paper P in the reversing conveyance unit 34 (the stop time at the timing when the conveying direction of the paper P is reversed), the interval between the sheets of paper P, or the like.

In the first embodiment described above, the printing apparatus 1 includes the printing unit 40, the print conveyance unit 50 for conveying the paper P (an example of the medium) in the printing unit 40, the constant-speed conveyance unit 33 for conveying the paper P at a variable constant conveying speed in the circulation route R2 for duplex printing, and the control unit 81 for determining the conveyance schedule for the paper P based on first conveyance route length L1 between the downstream end portion (the guide roller 55) in the conveying direction of the print conveyance unit 50 and the upstream end portion (the constant-speed roller pair 33*a*) in the conveying direction of the constant-speed conveyance unit 33, and the paper length L0 (an example of the medium length) of the paper P in the conveying direction.

As a result, even in the printing apparatus 1 having a simple configuration in which the circulation route R2 is not unnecessarily long, for example, when the paper length L0 is shorter than the first conveyance route length L1 as shown in FIG. 5, the conveying speed in the constant-speed conveyance unit 33 can be made higher than the conveying speed in the print conveyance unit 50. Therefore, in particular, when the number of sheets of paper P in the circulation route R2 can be increased by making the conveying speed in the constant-speed conveyance unit 33 higher than the conveying speed in the print conveyance unit 50, the productivity of duplex printing can be improved.

Further, in the first embodiment, when the sum of the paper length L0 and the distance required to increase the conveying speed v1 in the print conveyance unit 50 to the conveying speed v2 in the constant-speed conveyance unit 33 is equal to or less than the first conveyance route length L1, the control unit 81 makes the conveying speed v2 in the constant-speed conveyance unit 33 higher than the conveying speed v1 in the print conveyance unit 50 so as to increase the number of sheets of paper P (for example, increase from one sheet to two sheets) in the circulation route R2 as compared with the case where the conveying speed in the constant-speed conveyance unit 33 is equal to the conveying speed in the print conveyance unit 50.

Therefore, the conveying speed v2 in the constant-speed conveyance unit 33 is made higher than the conveying speed v1 in the print conveyance unit 50, and accordingly the number of sheets of paper P in the circulation route R2 is increased, whereby, for example, the productivity of duplex printing of the paper P is dramatically improved from 10.7 ppm to 42.7 ppm, as shown in FIG. 7.

Further, in the first embodiment, the printing apparatus 1 includes the paper ejection conveyance unit 36 (an example of the discharge conveyor) for conveying the paper P in the paper ejection route R3 (an example of the discharge route) connected to the circulation route R2. When the conveying speed in the constant-speed conveyance unit 33 is made equal to the conveying speed in the paper ejection conveyance unit 36 and when the conveying speed in the constant-speed conveyance unit 33 is made higher than the conveying speed in the print conveyance unit 50, the control unit 81 determines a conveyance schedule for the paper P so as to increase the number of sheets of paper P in the circulation route R2 as compared with the case where the conveying speed in the constant-speed conveyance unit 33 is equal to the conveying speed v1 in the print conveyance unit 50.

Therefore, even when it becomes difficult to increase the conveying speed in the constant-speed conveyance unit 33 to a conveying speed which is enough to increase the number of sheets of paper P in the circulation route R2 as described above due to making the conveying speed in the constant-speed conveyance unit 33 equal to the conveying speed in the paper ejection conveyance unit 36, it is possible to increase the number of sheets of paper P in the circulation route R2, for example, by adjusting the stop time of the paper P in the reversing conveyance unit 34, the interval between sheets of paper P or the like to determine the conveyance schedule for the paper P. As a result, the productivity of duplex printing on the paper P can be improved.

Further, in the first embodiment, when the sum of the paper length L0 and the distance required to increase the conveying speed v1 in the print conveyance unit 50 to the conveying speed v2 in the constant-speed conveyance unit 33 is a length exceeding the first conveyance route length L1, the control unit 81 makes the conveying speed in the constant-speed conveyance unit 33 equal to the conveying speed v1 in the print conveyance unit 50.

As a result, the paper P can be prevented from being pulled and damaged due to making the conveying speed in the constant-speed conveyance unit 33 higher than the conveying speed v1 in the print conveyance unit 50 when it is impossible to increase the conveying speed in the accelerating conveyance unit 32.

Further, in the first embodiment, the printing apparatus 1 further includes the external paper feeding unit 10 and the internal paper feeding unit 20 which are examples of the feeder feeding a medium (paper P) to the printing unit 40, and the paper detection sensor S which is arranged on the upstream side in the conveying direction of the printing unit 40 and is an example of the medium detection sensor for detecting the paper P. The control unit 81 calculates the paper length L0 based on the output value of the paper detection sensor S when the paper length L0 is unknown at the time of starting paper feeding of the paper P by the external paper feeding unit 10 and the internal paper feeding unit 20.

Therefore, especially when the paper P has a non-standard size, by calculating the paper length L0, it can be determined whether the conveying speed v2 in the constant-speed conveyance unit 33 can be made higher than the conveying speed v1 in the print conveyance unit 50 or whether the number of sheets of paper P in the circulation route R2 can be increased.

Second Embodiment

Figure 9:
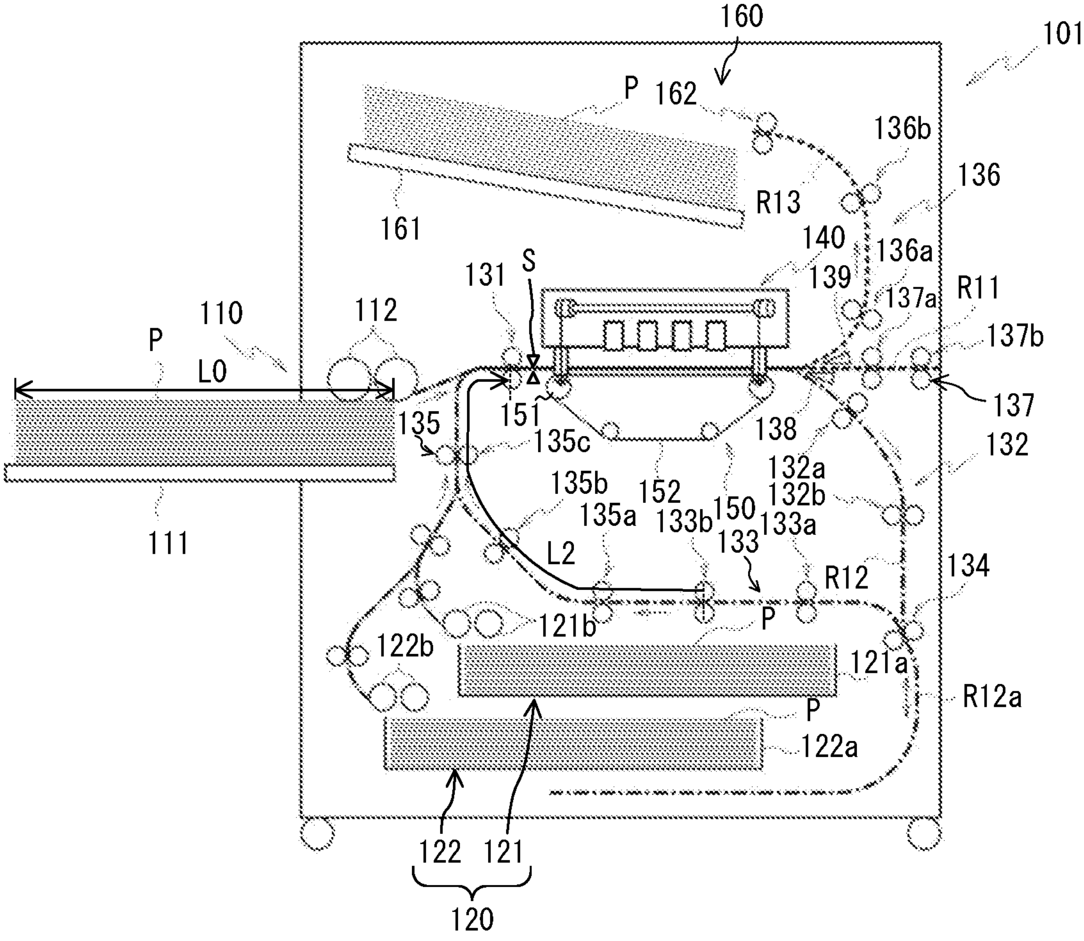
FIG. 9 is a diagram showing an internal structure of a printing apparatus according to a second embodiment.

FIG. 9 is a diagram showing an internal structure of a printing apparatus 101 according to a second embodiment.

Figure 10:
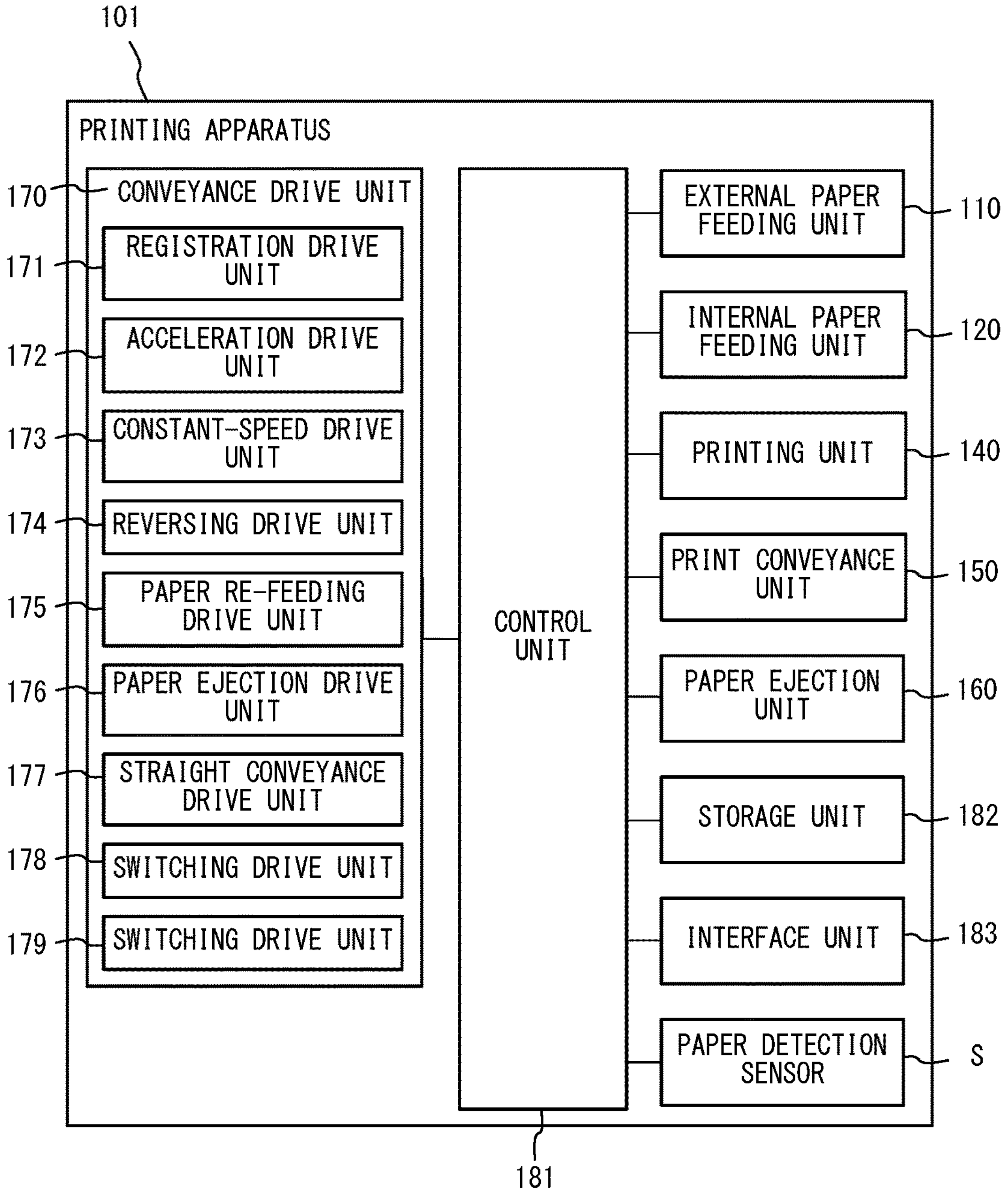
FIG. 10 is a diagram showing a control configuration of the printing apparatus according to the second embodiment.

FIG. 10 is a diagram showing a control configuration of the printing apparatus 101.

The printing apparatus 101 according to the second embodiment is different from the printing apparatus according to the first embodiment described above mainly in that a circulation route R12 is located below a printing unit 140, a reversing route R12*a* is located upstream of a constant-speed conveyance unit 133 in the conveying direction, a paper ejection conveyance unit 136 is provided at the outside portion of the circulation route R12, and the like. Respective units of the printing apparatus 101 according to the second embodiment are represented by reference signs in which 100 is appended to the reference signs of the corresponding units of the printing apparatus 1 according to the first embodiment (10 is appended for reference signs of routes starting with R), and description of common items will be omitted as appropriate.

As shown in FIGS. 9 and 10, the printing apparatus 101 includes an external paper feeding unit 110, an internal paper feeding unit 120, a printing unit 140, a print conveyance unit 150, a paper ejection unit 160, and a paper detection sensor S. Further, as shown in FIG. 9, the printing apparatus 101 includes a registration roller pair 131, an accelerating conveyance unit 132, a constant-speed conveyance unit 133, a reversing conveyance unit 134, a paper re-feeding unit 135, and a paper ejection conveyance unit 136, a straight conveyance unit 137, and route switching units 138 and 139. Further, as shown in FIG. 10, the printing apparatus 101 includes a conveyance drive unit 170, a control unit 181, a storage unit 182, and an interface unit 183.

In FIG. 9, a conveyance route from the registration roller pair 131 to the print conveyance unit 150 out of a straight route R11 is indicated by a solid line, a circulation route R12 including the reversing route R12*a* is indicated by one-dotted chain line, the straight route R11 and a paper ejection route R13 on the downstream side in the conveying direction of the print conveyance unit 150 are indicated by a broken line, and a conveyance route from the external paper feeding unit 110 and the internal paper feeding unit 120 to the registration roller pair 131 is indicated by two-dotted chain lines.

The external paper feeding unit 110 is arranged so as to be exposed to the outside of the printing apparatus 101. The external paper feeding unit 110 includes a paper feeding tray 111 on which sheets of paper P before printing are stacked, and paper feeding rollers 112 for drawing out and conveying a sheet of paper P located on the top of a plurality of sheets of paper P stacked on the paper feeding ray 111. Note that the external paper feeding unit 110 is an example of a feeder feeding a medium (for example, paper P) to the printing unit 140.

The internal paper feeding unit 120 has a first paper feeding unit 121 and a second paper feeding unit 122.

The first paper feeding unit 121 and the second paper feeding unit 122 are arranged in this order from above inside the printing apparatus 101. The first paper feeding unit 121 and the second paper feeding unit 122 respectively include paper feeding trays 121*a* and 122*a* on which sheets of paper P before printing are stacked, and paper feeding rollers 121*b* and 122*b* for drawing out and conveying sheets of paper P located at the tops of a plurality of sheets of paper P stacked on the paper feeding trays 121*a* and 122*a*. Note that the internal paper feeding unit 120 is an example of a feeder feeding a medium (for example, paper P) to the printing unit 140 like the external paper feeding unit 110.

The registration roller pair 131 is arranged on the upstream side of the printing unit 140 and the print conveyance unit 150 in the conveying direction in the straight route R11 continuing from the external paper feeding unit 110. The registration roller pair 131 is abutted by the paper P to be conveyed to the printing unit 140. The paper detection sensor S is arranged on the downstream side of the registration roller pair 131 in the conveying direction and on the upstream side of the printing unit 140 in the conveying direction. This paper detection sensor S is an example of a medium detection sensor for detecting a medium (for example, paper P), and for example, it outputs an ON signal during detection of the paper P and outputs an OFF signal during no detection of the paper P.

The accelerating conveyance unit 132 can accelerate and convey the paper P in the circulation route R12. The accelerating conveyance unit 132 includes accelerating roller pairs 132*a* and 132*b* that convey the paper P while nipping the paper P.

The constant-speed conveyance unit 133 conveys the paper P at a variable constant conveying speed on the downstream side of the accelerating conveyance unit 132 in the conveying direction in the circulation route R12. The constant-speed conveyance unit 133 includes constant-speed roller pairs 133*a* and 133*b* that convey the paper P while nipping the paper P.

The reversing conveyance unit 134 is a switchback roller pair that reverses the front and back of the paper P by performing switchback conveyance on the paper P in the reversing route R12*a* provided on the upstream side in the conveying direction of the constant-speed conveyance unit 133 of the circulation route R12.

The paper re-feeding unit 135 re-feeds the paper P to the printing unit 140 on the downstream side in the conveying direction of the constant-speed conveyance unit 133 in the circulation route R12. The paper re-feeding unit 135 includes paper re-feeding roller pairs 135*a*, 135*b*, and 135*c* that convey the paper P while nipping the paper P. The paper re-feeding unit 135 decelerates and conveys the paper P so that the paper P abuts against the registration roller pair 131 at a low speed.

The paper ejection conveyance unit 136 conveys the paper P to the paper ejection unit 160 in the paper ejection route R13 connected to the straight route R11. The paper ejection conveyance unit 136 includes paper ejection roller pairs 136*a* and 136*b* that convey the paper P while nipping the paper P.

The straight conveyance unit 137 is arranged at a downstream end portion of the straight route R11 in the conveying direction, and conveys the paper P to a paper ejection unit, a conveyance unit, a post-processing device, and the like (not shown) which are connected to the printing apparatus 101. The straight conveyance unit 137 includes straight roller pairs 137*a* and 137*b* that convey the paper P while nipping the paper P.

The route switching unit 138 switches the conveyance route of the paper P printed by the printing unit 140 between the straight route R11 and the circulation route R12. The route switching unit 138 is, for example, a flipper.

The route switching unit 139 switches the conveyance route of the paper P printed by the printing unit 140 between the straight route R11 and the paper ejection route R13. The route switching unit 139 is, for example, a flipper.

The printing unit 140 includes, for example, a line head type inkjet head (not shown) for each of colors used for printing.

The print conveyance unit 150 is arranged to face the printing unit 140, and conveys the paper P in the printing unit 140. The print conveyance unit 150 includes a plurality of pulleys 151, and a belt 152 stretched over these pulleys 151. Although not shown, as in the print conveyance unit 50 shown in FIG. 1, the print conveyance unit 150 may include a suction fan for sucking air through a plurality of holes provided in the belt 152 so that the paper P is adsorbed to the belt 152, a guide roller arranged to face the pulley 151 at an upstream end portion in the conveying direction of the print conveyance unit 150, and a guide roller arranged to face the pulley 151 at a downstream end portion in the conveying direction of the print conveyance unit 150.

The paper ejection unit 160 is arranged so as to be exposed to the outside of the printing apparatus 101. The paper ejection unit 160 includes a paper ejection tray 161 on which printed sheets of paper P are stacked, and a paper ejection roller pair 162 for conveying the paper P to the paper ejection tray 161.

The conveyance drive unit 170 shown in FIG. 10 includes a registration drive unit 171 for driving the registration roller pair 131, an acceleration drive unit 172 for driving the accelerating conveyance unit 132, a constant-speed drive unit 173 for driving the constant-speed conveyance unit 133, a reversing drive unit 174 for driving the reversing conveyance unit 134, a paper re-feeding drive unit 175 for driving the paper re-feeding unit 135, a paper ejection drive unit 176 for driving the paper ejection conveyance unit 136, a straight conveyance drive unit 177 for driving the straight conveyance unit 137, and switching drive units 178 and 179 for driving the route switching units 138 and 139. Each drive unit includes one or more actuators such as motors. Further, a single actuator may serve as a plurality of drive units.

The control unit 181 includes a processor (for example, CPU) that functions as an arithmetic processing unit for controlling the operation of the entire printing apparatus 101. Although details will be described later, the control unit 181 determines a conveyance schedule for paper P based on the second conveyance route length L2 between a downstream end portion (constant-speed roller pair 133*b*) in the conveying direction of the constant-speed conveyance unit 133 and the registration roller pair 131, and the paper length L0 in the conveying direction of the paper P. Even in the second embodiment, when the paper length L0 is unknown at the time when paper feeding of the paper P is started by the external paper feeding unit 110 or the internal paper feeding unit 120, the control unit 181 may calculate the paper length L0 based on the output value of the paper detection sensor S.

The storage unit 182 includes, for example, memories such as ROM which is a read-only semiconductor memory in which predetermined control programs are recorded in advance, and RAM that is a semiconductor memory which is used as a work storage area as necessary when the processor executes various control programs and can be written and read at any time, and a hard disk device, and the like.

The interface unit 183 receives and transmits various types of information from and to external devices. For example, the interface unit 183 receives a print job including print data from a user terminal.

In the following description, determination of a conveyance schedule for paper P having a non-standard length (450 mm, for example) whose paper length L0 in the conveying direction exceeds, for example, the longitudinal size (420 mm) of A3 size (420 mm×297 mm) will be described with reference to FIG. 11.

Figure 11:
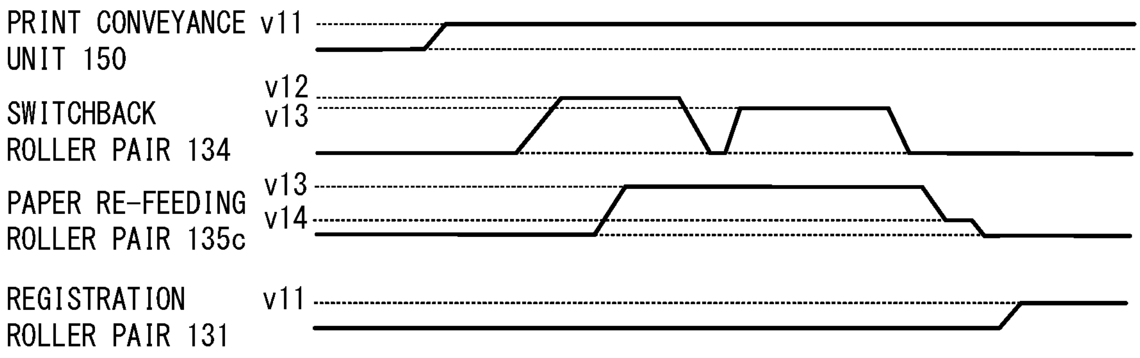
FIG. 11 is a diagram showing the conveying speed when the length of paper is shorter than a second conveyance route length in the second embodiment.

FIG. 11 is a diagram showing the conveying speed when the paper length L0 is shorter than the second conveyance route length L2.

When the sum of the medium length L0 and the distance required to reduce the conveying speed in constant-speed conveyance unit 133 till a prescribed abutting speed (low speed) against the registration roller pair 131 is a length exceeding the second conveyance route length L2, if the paper re-feeding unit 135 performs decelerating conveyance because the constant-speed conveyance unit 133 cannot perform decorating conveyance, it causes not only damage on the paper P due to pulling or folding of the paper P or the like, but also jams of the paper P. Therefore, when the above sum exceeds the second conveyance route length L2, the conveying speed in the constant-speed conveyance unit 133 cannot be increased because a plurality of sheets of paper P are conveyed in the circulation route, and printing productivity cannot be improved. In this case, the conveying speed in the constant-speed conveyance unit 133 is, for example, set to be equal to the conveying speed of the print conveyance unit 150.

On the other hand, when the sum of the distance required for the above deceleration and the medium length L0 is equal to or less than the second conveyance route length L2, the conveying speed in the constant-speed conveyance unit 133 can be made higher than, for example, the conveying speed in the print conveyance unit 150 so as to increase the number of sheets of paper P in the circulation route R2 to two sheets.

As shown in FIG. 11, the control unit 181 shown in FIG. 10 sets the conveying speed in the print conveyance unit 150 and the registration roller pair 131 to a conveying speed v11. Further, the control unit 181 sets the conveying speed on the normal rotation side of the reversing conveyance unit (switchback roller pair) 134 corresponding to the conveying speed in the accelerating conveyance unit 132 to a conveying speed v12 which is higher than a conveying speed v13 in the constant-speed conveyance unit 133 corresponding to the conveying speed on the reverse side after switchback in the reversing conveyance unit 134 and the conveying speed v11 in the print conveyance unit 150. Further, the control unit 181 reduces the conveying speed in the paper re-feeding unit 35 (paper re-feeding roller pair 135*c*) from the same conveying speed v13 as that of the constant-speed conveyance unit 133 till a prescribed abutting speed v14 before the paper P abuts against the registration roller pair 131. Note that the conveying speed v13 in the constant-speed conveyance unit 133 is set so that the sum of the distance required for the above deceleration and the medium length L0 is equal to or less than the second conveyance route length L1 within a range in which the number of sheets of paper P in the circulation route R12 can be set to, not one sheet, but two sheets. In order to satisfy this relationship, a conveyance schedule for the paper P may be determined to suppress the conveying speed v13 because there is a limit to how high the conveying speed v13 in the constant-speed conveyance unit 133 can be increased. For example, the conveyance schedule may be determined by increasing the conveying speed v12 on the normal rotation side of the reversing conveyance unit (switchback roller pair) 134, increasing a remaining amount by which the rear end of the paper P is protruded from the reversing route R12*a* when the reversing conveyance unit 134 performs switchback on the paper P, shortening the stop time of the paper P during switchback, reducing a slack amount when the paper P abuts against the registration roller pair 131, increasing the abutting speed v14, or shortening a time for which this abutting speed v14 is maintained.

In the second embodiment, unlike the first embodiment, the control unit 181 determines the conveyance schedule for the paper P based on the paper length L0 and the second conveyance route length L2 between the downstream end portion (the constant-speed roller pair 133*b*) in the conveying direction of the constant-speed conveyance unit 133 and the registration roller pair 131, but it may determine the conveyance schedule for the paper P additionally based on the first conveyance route length between the downstream end portion in the conveying direction of the print conveyance unit 150 and the upstream end portion (constant-speed roller pair 133*a*) in the conveying direction of the constant-speed conveyance unit 133. However, in the printing apparatus 101 shown in FIG. 9, the reversing conveyance unit 134 is located on the downstream side in the conveying direction of the print conveyance unit 150 and on the upstream side in the conveying direction of the constant-speed conveyance unit 133. 3, so that the paper length L0 is prevented from being longer than the first conveyance route length L1 as in the first embodiment described above shown in FIG. 3. Likewise, in the printing apparatus 1 according to the first embodiment described above shown in FIG. 1, the paper length L0 is prevented from being longer than the second conveyance route length because the reversing conveyance unit 34 is located on the downstream side in the conveying direction of the constant-speed conveyance unit 33 and on the upstream side of the print conveyance unit 50.

In the second embodiment described above, the printing apparatus 101 includes the printing unit 140, the print conveyance unit 150 for conveying the paper P (an example of the medium) in the printing unit 140, the constant-speed conveyance unit 133 for conveying the paper P at a variable constant conveying speed in the circulation route R12 for duplex printing, and the control unit 181 for determining the conveyance schedule for the paper P based on the second conveyance route length L2 between the downstream end portion (the constant-speed roller pair **133*b*) in the conveying direction of the constant-speed conveyance unit 133 and the registration roller pair 131, and the paper length L0** (an example of the medium) in the conveying direction of the paper P. As a result, as in the first embodiment described above, it is possible to improve the productivity of duplex printing with a simple configuration.

Further, in the second embodiment, when the sum of the medium length L0 and the distance required to reduce the conveying speed v13 in the constant-speed conveyance unit 133 till the prescribed abutting speed v14 against the registration roller pair 131 is equal to or less than the second conveyance route length L2, the control unit 181 increases the number of sheets of paper P in the circulation route R12 as compared with the case where the sum is a length exceeding the second conveyance route length L2.

Therefore, when the paper P can be decelerated to the prescribed abutting speed v14 against the registration roller pair 131, the conveying speed v13 in the constant-speed conveyance unit 133 is increased to increase the number of sheets of paper P in the circulation circuit R12 as compared with the case where it is impossible to decelerate the paper P, whereby it is possible to improve the productivity of duplex printing while avoiding damage to the paper P due to pulling and folding of the paper P and occurrence of jams.

Further, in the second embodiment, when the sum of the medium length L0 and the distance required to reduce the conveying speed v13 in the constant-speed conveyance unit 133 till the prescribed abutting speed v14 against the registration roller pair 131 is a length exceeding the second conveyance route length L2, the control unit 181 makes the conveying speed v13 in the constant-speed conveyance unit 133 equal to the conveying speed v11 in the print conveyance unit 150.

As a result, it can be avoided that pulling and folding of the paper P damages the paper P or causes jams due to making the conveying speed v13 in the constant-speed conveyance unit 133 higher than the conveying speed v11 in the print conveyance unit 150 when the conveying speed in the paper re-feeding unit 135 cannot be reduced.

Further, in the second embodiment, as in the first embodiment described above, the printing apparatus 101 further includes the external paper feeding unit 110 and the internal paper feeding unit 120 that are examples of the feeder feeding the medium (paper P) to the printing unit 140, and the paper detection sensor S which is arranged on the upstream side in the conveying direction of the printing unit 140, and is an example of the medium detection sensor for detecting the paper P. The control unit 181 calculates the paper length L0 based on the output value of the paper detection sensor S when the paper length L0 is unknown at the time of starting the paper feeding of the paper P by the external paper feeding unit 110 and the internal paper feeding unit 120.

Therefore, especially when the paper P has a non-standard size, it can be determined by calculating the paper length L0 whether it is possible to increase the conveying speed v13 in the constant-speed conveyance unit 133, or whether it is possible to increase the number of sheets of paper P in the circulation route R12.

The present invention is not limited to the above-described embodiments as they are, and can be embodied by modifying constituent elements without departing from the gist of the present invention at the implementation stage. Further, various inventions can be formed by appropriate combinations of the plurality of constituent elements disclosed in the above-described embodiments. For example, all the constituent elements shown in the embodiments may be combined as appropriate. It goes without saying that various modifications and applications are possible without departing from the spirit of the invention.

In one aspect, the present application relates to a printing apparatus comprising:

a printing section;

a print conveyor conveying a medium in the printing section;

a constant-speed conveyor conveying the medium at a variable constant conveying speed in a circulation route for duplex printing;

a registration roller pair against which the medium to be conveyed to the printing section is caused to abut; and a processor determining a conveyance schedule for the medium based on at least one of a first conveyance route length between a downstream end portion in a conveying direction of the print conveyor and an upstream end portion in the conveying direction of the constant-speed conveyor and a second conveyance route length between a downstream end portion in the conveying direction of the constant-speed conveyor and the registration roller pair, and a medium length in the conveying direction of the medium.

In one other aspect, when a sum of the length of the medium and a distance required to increase a conveying speed in the print conveyor to a conveying speed in the constant-speed conveyor is equal to or less than the first conveyance route length, the processor causes the conveying speed in the constant-speed conveyor to be higher than the conveying speed in the print conveyor so as to increase the number of sheets of the medium in the circulation route as compared with a case where the conveying speed in the constant-speed conveyor is equal to the conveying speed in the print conveyor.

In one other aspect, the printing apparatus further comprising a discharge conveyor conveying the medium in a discharge route connected to the circulation route, wherein when a conveying speed in the constant-speed conveyor is made equal to a conveying speed in the discharge conveyor, and when the conveying speed in the constant-speed conveyor is made higher than a conveying speed in the print conveyor, the processor determines a conveyance schedule for the medium so as to increase the number of sheets of the medium in the circulation route as compared with a case where the conveying speed in the constant-speed conveyor is equal to the conveying speed in the print conveyor.

In one other aspect, when a sum of the medium length and a distance required to reduce a conveying speed in the constant-speed conveyor till a prescribed abutting speed against the registration roller pair is equal to or less than the second conveyance route length, the processor increases the number of sheets of the medium in the circulation route as compared with a case where the sum is a length exceeding the second conveyance route length.

In one other aspect, the processor makes a conveying speed in the constant-speed conveyor equal to a conveying speed in the print conveyor in at least one of a case where when a sum of the length of the medium and a distance required to increase a conveying speed in the print conveyor to a conveying speed in the constant-speed conveyor is exceeding the first conveyance route length and a case where a sum of the medium length and a distance required to reduce a conveying speed in the constant-speed conveyor till a prescribed abutting speed against the registration roller pair is exceeding the second conveyance route length.

In one other aspect, the printing apparatus further comprising:

a feeder feeding the medium to the printing section; and a medium detection sensor that is arranged on an upstream side of the printing section in the conveying direction and detects the medium, wherein the control unit calculates the medium length based on an output value of the medium detection sensor when the medium length is unknown when the feeder starts feeding the medium.

What is claimed is:

1. A printing apparatus comprising:

- a printing section;
- a print conveyor conveying a medium in the printing section;
- a constant-speed conveyor conveying the medium at a variable constant conveying speed in a circulation route for duplex printing;
- a registration roller pair against which the medium to be conveyed to the printing section is caused to abut; and
- a processor determining a conveyance schedule for the medium based on at least one of a first conveyance route length between a downstream end portion in a conveying direction of the print conveyor and an upstream end portion in the conveying direction of the constant-speed conveyor and a second conveyance route length between a downstream end portion in the conveying direction of the constant-speed conveyor and the registration roller pair, and a medium length in the conveying direction of the medium.

2. The printing apparatus according to claim 1, wherein when a sum of the length of the medium and a distance required to increase a conveying speed in the print conveyor to a conveying speed in the constant-speed conveyor is equal to or less than the first conveyance route length, the processor causes the conveying speed in the constant-speed conveyor to be higher than the conveying speed in the print conveyor so as to increase the number of sheets of the medium in the circulation route as compared with a case where the conveying speed in the constant-speed conveyor is equal to the conveying speed in the print conveyor.

3. The printing apparatus according to claim 1, further comprising a discharge conveyor conveying the medium in a discharge route connected to the circulation route, wherein when a conveying speed in the constant-speed conveyor is made equal to a conveying speed in the discharge conveyor, and when the conveying speed in the constant-speed conveyor is made higher than a conveying speed in the print conveyor, the processor determines a conveyance schedule for the medium so as to increase the number of sheets of the medium in the circulation route as compared with a case where the conveying speed in the constant-speed conveyor is equal to the conveying speed in the print conveyor.

4. The printing apparatus according to claim 1, wherein when a sum of the medium length and a distance required to reduce a conveying speed in the constant-speed conveyor till a prescribed abutting speed against the registration roller pair is equal to or less than the second conveyance route length, the processor increases the number of sheets of the medium in the circulation route as compared with a case where the sum is a length exceeding the second conveyance route length.

5. The printing apparatus according to claim 1, wherein the processor makes a conveying speed in the constant-speed conveyor equal to a conveying speed in the print conveyor in at least one of a case where when a sum of the length of the medium and a distance required to increase a conveying speed in the print conveyor to a conveying speed in the constant-speed conveyor is exceeding the first conveyance route length and a case where a sum of the medium length and a distance required to reduce a conveying speed in the constant-speed conveyor till a prescribed abutting speed against the registration roller pair is exceeding the second conveyance route length.

6. The printing apparatus according to claim 1, further comprising:

- a feeder feeding the medium to the printing section; and
- a medium detection sensor that is arranged on an upstream side of the printing section in the conveying direction and detects the medium, wherein the processor calculates the medium length based on an output value of the medium detection sensor when the medium length is unknown when the feeder starts feeding the medium.

* * * * *